United States Patent [19]

Nonoyama et al.

[11] 4,241,751
[45] Dec. 30, 1980

[54] VACUUM TRANSMITTING VALVE

[75] Inventors: Takao Nonoyama; Kunihiko Sato, both of Toyoda, Japan

[73] Assignee: Toyota Jidosha Kogyo Kabushiki Kaisha, Toyota, Japan

[21] Appl. No.: 953,209

[22] Filed: Oct. 21, 1978

Related U.S. Application Data

[63] Continuation of Ser. No. 740,042, Nov. 8, 1976, abandoned.

[30] Foreign Application Priority Data

May 7, 1976 [JP] Japan .................. 51-58100

[51] Int. Cl.³ .................... F02P 5/06; F02P 5/10; F16K 45/00
[52] U.S. Cl. .................... 137/103; 137/513.7; 123/409
[58] Field of Search .................... 137/103, 513.3, 513.5, 137/513.7, 102, 854; 123/119 D, 119 DB, 117 A

[56] References Cited

U.S. PATENT DOCUMENTS

| 3,638,626 | 2/1972 | Marshall | 123/117 A |
| 3,857,373 | 12/1974 | Martin et al. | 123/117 A |
| 3,982,555 | 9/1976 | Aubel et al. | 123/117 A |
| 4,010,721 | 3/1977 | Ludwig | 123/117 A |
| 4,015,568 | 4/1977 | Horiye | 123/119 D |
| 4,044,732 | 8/1977 | Inada et al. | 123/119 D |

Primary Examiner—William R. Cline
Attorney, Agent, or Firm—Stevens, Davis, Miller & Mosher

[57] ABSTRACT

Disclosed is an improvement in a vacuum transmitting valve for an exhaust gas purifying system on an automobile engine, of the type which has an inlet chamber and an outlet chamber divided by a partition which is provided with a vacuum transmitting orifice. The inlet chamber has at least one opening for bleeding purging air into the inlet chamber to expel therefrom any gasoline vapor that might otherwise reach and clog the orifice.

5 Claims, 3 Drawing Figures

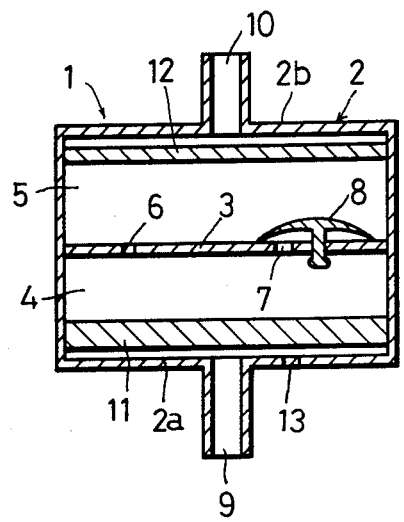
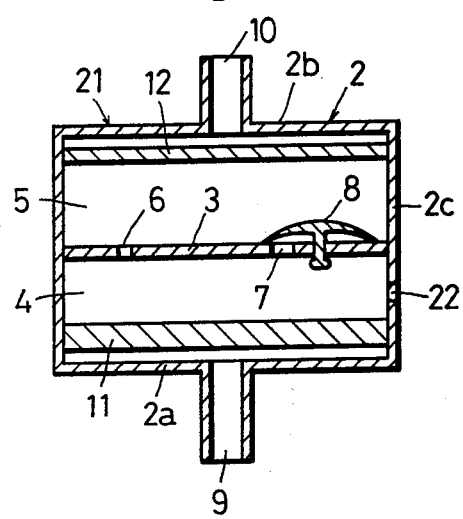
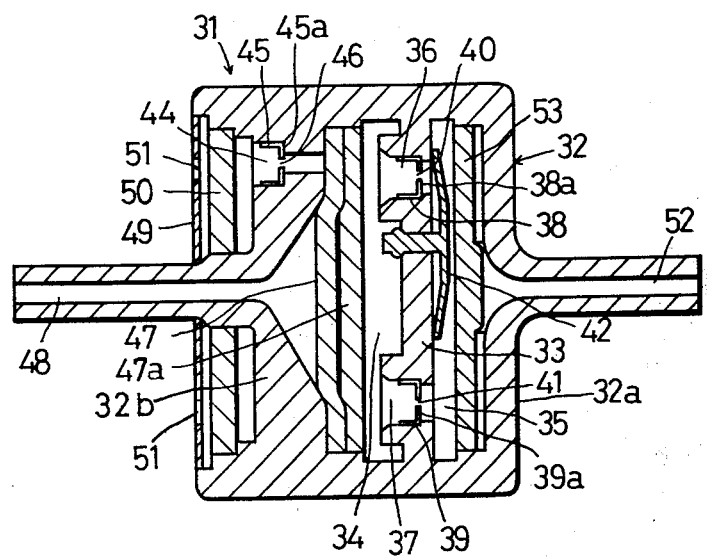

VACUUM TRANSMITTING VALVE

This is a continuation of application Ser. No. 740,042 filed Nov. 8, 1976, now abandoned.

This invention relates to an improvement in a vacuum transmitting valve for an exhaust gas purifying system on an automobile internal combustion engine, of the type which is connected to an intake manifold or carburetor on the automobile to pick up a vacuum or negative pressure therefrom and transmit it to a vacuum advancer, a throttle positioner, a choke opener or a recombustion air injector with a certain time lag. More particularly, this invention concerns the prevention of any sticky ingredient of gasoline vapor from reaching and the vacuum transmitting orifice in the valve.

A conventional vacuum transmitting valve has two valve chambers divided by a partition in a casing, one of which is provided with an inlet port for introducing a vacuum or negative pressure, while the other is provided with an outlet port for discharging the negative pressure. The partition has an orifice of small diameter, an air vent having a diameter larger than that of the orifice and a check valve member provided in the valve chamber having the outlet port for opening and closing the air vent. The diameter of the orifice must generally be very small for obtaining a sufficient delay of negative pressure transmission. Gasoline vapor is apt to enter the valve because the negative pressure is transmitted from an intake manifold or a carburetor. If tar in gasoline adheres to the vicinity of the orifice, the area of the orifice through which the negative pressure is transmitted becomes smaller, which causes difficulty in the transmission of the negative pressure through the orifice thereby decreasing the functioning of the valve, until finally the orifice is totally clogged.

It is, therefore, an object of this invention to provide an improved vacuum transmitting valve of the sort herein described, wherein its orifice is prevented from being clogged by ingredients of gasoline.

It is another object of this invention to provide an improved vacuum transmitting valve of simple construction which may operate in a substantially trouble-free fashion with a minimum of maintenance over a long period of time.

The invention will now be described in detail, merely by way of example, with reference to the accompanying drawings, in which:

FIG. 1 is a longitudinal sectional view of a vacuum transmitting valve embodying this invention;

FIG. 2 is a longitudinal sectional view of another embodiment of this invention; and FIG. 3 is a longitudinal sectional view of a further embodiment of this invention.

Referring now more particularly to the drawings, especially FIG. 1 thereof, there is shown a vacuum transmitting valve 1 having a casing 2 in which two valve chambers 4 and 5 are defined by a partition 3. The partition 3 is provided with an orifice 6 having a small diameter and an air vent 7 having a larger diameter than the orifice 6. A check valve member 8 is provided in the valve chamber 5 and covers the air vent 7. The casing 2 has a first end plate 2a which is parallel to the partition 3 and through which a negative pressure inlet port 9 opens into first valve chamber 4. The casing 2 has a second end plate 2b which is also parallel to the partition 3 and through which a negative pressure outlet port 10 opens into second valve chamber 5. A filter 11 is provided in the valve chamber 4 in the vicinity of the inlet port 9, while another filter 12 is provided in the valve chamber 5 in the vicinity of the outlet port 10. The filter 11 is thicker than the filter 12. An air bleed opening 13 is provided in the end plate 2a of the casing 2 to communicate the valve chamber 4 with the atmosphere.

FIG. 2 shows a vacuum transmitting valve 21 of exactly the same structure as the valve 1 of FIG. 1 except that the air bleed opening, 22 in FIG. 2, is formed through the side wall 2c of the casing. Otherwise, like reference numerals are used to indicate like parts both in FIGS. 1 and 2.

The inlet port 9 of either valve 1 or 21 is connected with an appropriate port in an engine intake manifold, not shown, and the outlet port 10 is connected to a choke opener, a throttle positioner or the like, also not shown. When the valve chamber 4 has a lower pressure than the valve chamber 5 upon introduction of a negative pressure through the inlet port 9, the check valve member 8 closes the air vent 7 for cutting off the communication between the valve chambers 4 and 5, and the negative pressure is transmitted to a throttle positioner and the like through the orifice 6 after a certain delay time. When the pressure of the valve chamber 4 becomes higher than that of the valve chamber 5, the check valve member 8 opens the air vent 7 for communicating the valve chamber 4 with the valve chamber 5. A substantial part of the gasoline vapor carried forward from the intake manifold is removed by the filter 11, but some vapor passes through the filter 11 and is not removed until it reaches the other filter 12 through the orifice 6. When such residual vapor passes through the orifice 6, gum or other sticky ingredients of gasoline are apt to adhere to and clog the orifice 6. Such a tendency may be, however, removed thoroughly by the provision of the air bleed opening 13 or 22. A small amount of air is constantly introduced into the valve chamber 4 through the air bleed opening 13 or 22 to drive out gasoline vapor from the filter 11 and let it flow back through the inlet port 9, so that no gasoline flows into the valve chamber 5 through the orifice 6. Accordingly, no gum or other sticky ingredient of gasoline adheres to and clogs the orifice 6. The following table shows the results of the purging tests conducted with the valves 1 and 21 of this invention in contrast to a conventional valve having no air bleed opening of the sort as herein described.

Table 1

| Test condition | | Suction for 3 min. with a negative pressure of −100mmHg through the inlet port | | Suction for 3 min. with a negative pressure of −65mmHg through the inlet port | |
|---|---|---|---|---|---|
| Air bleed opening | | None | Provided as shown in FIG. 1 | Provided as shown in FIG. 1 | Provided as shown in FIG. 2 |
| Amount of gasoline in | Before purging | 460 | 455 | 500 | 575 |

Table 1-continued

| Test condition | | Suction for 3 min. with a negative pressure of −100mmHg through the inlet port | | Suction for 3 min. with a negative pressure of −65mmHg through the inlet port | |
|---|---|---|---|---|---|
| Air bleed opening | | None | Provided as shown in FIG. 1 | Provided as shown in FIG. 1 | Provided as shown in FIG. 2 |
| valve chamber (mg) | After purging | 445 | 215 | 320 | 255 |
| | Amount removed | 15 | 240 | 180 | 320 |

The test results reveal an unexpected remarkable effect of air purging and also indicate that the air bleed opening is more effective when it is positioned as shown in FIG. 2 that when positioned as shown in FIG. 1.

Referring to FIG. 3, there is shown a valve 31 according to a further embodiment of this invention having a casing 32 in which two valve chambers 34 and 35 are defined by a partition 33. Two circular openings 36 and 37 are provided in the partition 33, and a pair of hollow cylindrical members 38 and 39 are inserted in the openings 36 and 37, respectively. Each of the cylindrical member 38 and 39 is open at one end and substantially closed at the other end by an end plate, 38a or 39a. The end plates 38a and 39a, respectively have an air vent 40 and an orifice 41, respectively. The opening 36 and, hence the air vent 10, is opened or closed by a check valve member 42 which is secured to the partition 33. When the first valve chamber 34 has a pressure lower than that of the second valve chamber 35, the check valve member 42 closes the opening 36 to prevent the fluid communication between the valve chambers 34 and 35 through the air vent 40, while on the other hand,, when the valve chamber 34 has a pressure higher than that of the valve chamber 35, the check valve member 42 opens to communicate the valve chambers 34 and 35 through the air vent 40. The casing 32 has two end plates 32a and 32b. An air bleed opening 44 having a circular cross section is provided in the first end plate 32b and supports therein a hollow cylindrical member 45 which is open at one end and generally closed at another end by an end plate 45a having an orifice 46 in its center. A pair of planar filter members 47 and 47a are provided between the partition 33 and the end plate 32b and laid one upon the other. The filter members 47 and 47a have peripheral edges contacting the internal surface of the casing 32 and the filter member 47 remote from the partition 33 is in contact with the second end plate 32b. The filter members 47 and 47a extend over the end of the air bleed opening 44 which is open into the valve chamber 34. Another filter member 50 is secured to the end plate 32b on the opposite side of the end plate 32b from the filter members 47 and 47a and extends over the end of the air bleed opening 44 which is remote from the valve chamber 34. The end plate 32b is provided in its center with an inlet port 48 for introducing a negative pressure into the valve chamber 34. A circular cover plate 49 is attached to the casing 32 and encircles the inlet port 48 in a position outwardly of the filter member 50. A plurality of additional air bleed openings 51 are provided in the cover plate 49. The end plate 32a of the casing 32 is formed with an outlet port 52 in the center thereof. A filter member 53 is provided in the valve chamber 35 in parallel relation to the partition 33 and the end plate 32a. The filter member 53 is practically as thick as the filter members 47 and 47a provided in the valve chamber 34.

In operation, when a negative pressure develops in the valve chamber 34 by suction through the inlet port 48, the check valve member 42 closes the opening 36, and the negative pressure is transmitted to the outlet port 52 through the orifice 41 after a certain time lag. Gasoline vapors carried forward from an engine intake manifold are trapped by the filter members 47 and 47a. The gasoline vapors are driven out of the filters 47 and 47a by a controlled amount of air introduced thereinto through the air bleed openings 51, the filter 50, the air bleed opening 44 and the orifice 46 and flow back through the inlet port 48. Thus, gasoline vapor scarcely reaches the orifice 41 and no tar or other sticky gasoline ingredient adheres to the orifice 41.

It will be noted that a stream of purging air flows through the valve 31 of FIG. 3 in a pattern similar to that achieved through the valve 21 of FIG. 2; therefore, the valve 31 can provide as excellent a purging effect as the valve 21. It is to be noted that the valve of FIG. 3 can be made of more compact construction than the valve of FIG. 21, while maintaining an equal purging effect as mentioned above.

What is claimed is:

1. In a vacuum transmitting valve of the type including:
    a casing having a first end wall, a second end wall, and a cylindrical side wall;
    a partition defining a first chamber and a second chamber in said casing, said partition having an orifice and an air vent;
    an inlet port opening into said first chamber through said first end wall;
    an outlet port opening into said second chamber through said second end wall; and
    a closure member secured to said partition, said closure member being movable to close said air vent when the pressure of said first chamber is lower than that of said second chamber, and open said air vent when the pressure of said first chamber becomes higher than that of said second chamber;
    the improvement which comprises:
    an air bleed opening in fluid communication with said first chamber;
    a filter member in said first chamber;
    a cover plate in fluid communication with said air bleed opening, said cover plate being attached to an external wall of said casing; and
    a filter member disposed between said wall of said casing and said cover plate.

2. In a vacuum transmitting valve of the type including:

a casing having a first end wall, a second end wall, and a cylindrical side wall;

a partition defining a first chamber and a second chamber in said casing, said partition having an orifice and an air vent;

an inlet port opening into said first chamber through said first end wall;

an outlet port opening into said second chamber through said second end wall; and a closure member secured to said partition, said closure member being movable to close said air vent when the pressure of said first chamber is lower than that of said second chamber, and open said air vent when the pressure of said first chamber becomes higher than that of said second chamber;

the improvement which comprises:

an air bleed opening in said first end wall in fluid communication with said first chamber;

a filter member provided in said first chamber and attached to said first end wall;

a cover plate in fluid communication with said air bleed opening, said cover plate being attached to the side of said first end wall opposite to said first chamber; and a filter member disposed between said first end wall and said cover plate.

3. A vacuum transmitting valve as in claim 2 wherein the filter member in said first chamber is a double-layered filter member.

4. A vacuum transmitting valve as in claim 2 wherein said air bleed opening has a circular cross section.

5. A vacuum transmitting valve as in claim 2 wherein said cover plate contains a plurality of air bleed openings.

* * * * *